(12) United States Patent
Gibson et al.

(10) Patent No.: US 11,144,981 B2
(45) Date of Patent: Oct. 12, 2021

(54) METHOD AND SYSTEM FOR SIMILARITY MODELING AND IDENTIFICATION

(71) Applicant: NCR Corporation, Duluth, GA (US)

(72) Inventors: Ray A. Gibson, Lewisville, TX (US); Claudio Cifarelli, Rome (IT); Luis Antonio Diaz, Hurst, TX (US); Rakesh Patel, Decatur, GA (US)

(73) Assignee: NCR Corporation, Atlanta, GA (US)

( * ) Notice: Subject to any disclaimer, the term of this patent is extended or adjusted under 35 U.S.C. 154(b) by 554 days.

(21) Appl. No.: 15/718,903

(22) Filed: Sep. 28, 2017

(65) Prior Publication Data

US 2019/0095975 A1 Mar. 28, 2019

(51) Int. Cl.
*G06Q 30/00* (2012.01)
*G06Q 30/06* (2012.01)
*G06Q 30/02* (2012.01)
*G06Q 50/00* (2012.01)

(52) U.S. Cl.
CPC ..... *G06Q 30/0631* (2013.01); *G06Q 30/0282* (2013.01); *G06Q 50/01* (2013.01)

(58) Field of Classification Search
CPC . G06Q 30/0601–0645; G06Q 30/0631; G06Q 30/0282; G06Q 50/01
USPC .............................. 705/26.1–27.2, 347, 319
See application file for complete search history.

(56) References Cited

U.S. PATENT DOCUMENTS

| | | | | |
|---|---|---|---|---|
| 2004/0225509 A1* | 11/2004 | Andre | ................... | G06Q 30/02 705/26.7 |
| 2009/0012902 A1* | 1/2009 | Alderucci | ................. | G07F 5/24 705/80 |
| 2010/0191582 A1* | 7/2010 | Dicker | ................... | G06Q 30/02 705/14.51 |
| 2010/0268661 A1* | 10/2010 | Levy | ...................... | G06Q 30/02 705/347 |
| 2015/0006314 A1* | 1/2015 | Goulart | ............. | G06Q 30/0631 705/26.7 |

(Continued)

OTHER PUBLICATIONS

Monocello, Mark. Point of Sale Advantages: Top 10 Reasons POS Systems are Better Than Cash Registers. Aug. 28, 2010. pointofsale. com. Accessed via https://pointofsale.com/top-ten-reasons-point-of-sale-systems-are-better-than-cash-registers/ (Year: 2010).*

*Primary Examiner* — Allison G Wood
(74) *Attorney, Agent, or Firm* — Schwegman, Lundberg & Woessner

(57) ABSTRACT

Various embodiments herein include an engine that uses data science, history, and trends to successfully determine and suggest the complimentary add on and upsell items that are tailored to at least some of the customer, current trends, product popularity, recommendations, and other such factors. One embodiment, in the form of a method, includes receiving, from a process involved in processing an open transaction, data representative of at least one of products and services that are subjects of the open transaction. The method further includes querying a recommendation engine for at least one of product and service recommendations based on the received data representative of products and services and receiving, in response to the query, at least one product or service recommendation. The method may then provide the at least one product recommendation to the process involved in processing the open transaction.

5 Claims, 3 Drawing Sheets

(56) References Cited

U.S. PATENT DOCUMENTS

2015/0100454 A1\* 4/2015 Cook ................. G06Q 30/0631
705/26.7
2017/0278173 A1\* 9/2017 Ettl ...................... G06Q 10/087

\* cited by examiner

METHOD AND SYSTEM FOR SIMILARITY MODELING AND IDENTIFICATION

BACKGROUND INFORMATION

Upselling is a mantra that all businesses understand and try to leverage to increase revenue. A challenge is that most business upsell effort has not changed for many years. These upsell methods often are based on manual upsell offers of fixed items that may even leave the consumer confused as they are not relevant their respective baskets, such as offering a consumer a soft drink at a checkout in an electronics store. Such upsell offers are also typically static, such as in restaurants and the simple question, "Would you like fries with that?" While such offers may have been initially considered successful, such offers being static, non-customer specific, and limited in number are limited in just how successful they can be.

SUMMARY

Various embodiments herein include an engine that uses data science, history, and trends to successfully determine and suggest the complimentary add on and upsell items that are tailored to at least some of the customer, current trends, product popularity, recommendations, and other such factors.

One embodiment, in the form of a method, includes receiving, from a process involved in processing an open transaction, data representative of at least one of products and services that are subjects of the open transaction. The method further includes querying a recommendation engine for at least one of product and service recommendations based on the received data representative of products and services and receiving, in response to the query, at least one product or service recommendation. The method may then provide the at least one product recommendation to the process involved in processing the open transaction.

Another method embodiment includes querying a recommendation engine for at least one product recommendation based on received data representative of products present within an open transaction. This method may then provide at least one product recommendation to a process from which the data representative of the products present within an open transaction was received.

A further embodiment, in the form of a system, includes a processor, a network interface device, and a memory storing instructions executable by the processor to perform data processing activities. The data processing activities include receiving, via the network interface device, from a process involved in processing an open transaction, data representative of at least one of products and services that are subjects of the open transaction. The data processing activities may then query a recommendation engine that executes on the processor for at least one of product and service recommendations based on the received data representative of products and services. The data processing activities may then receive, in response to the query, at least one product or service recommendation and provide, via the network interface device, the at least one product recommendation to the process involved in processing the open transaction.

DETAILED DESCRIPTION

Figure 1:
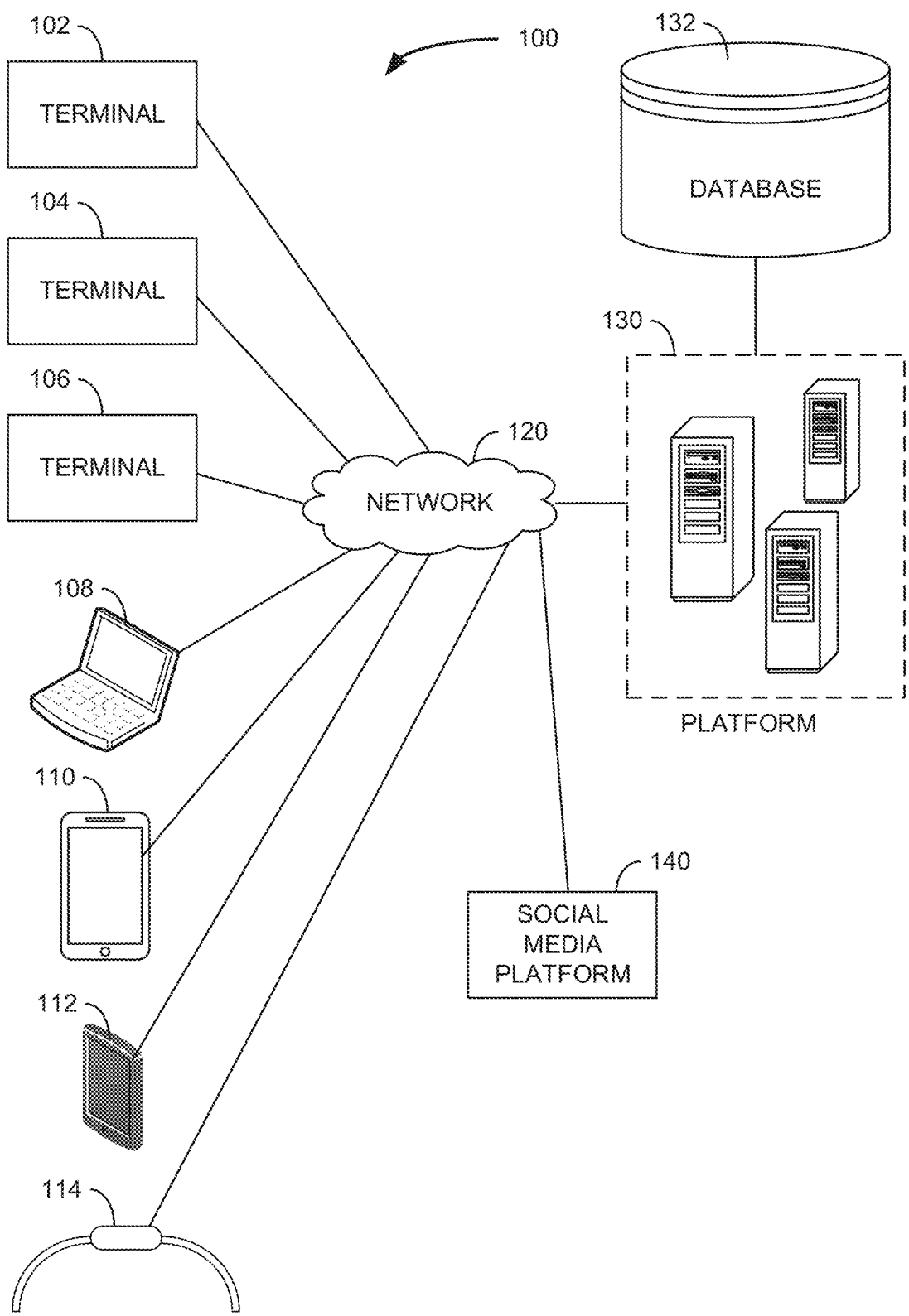
FIG. 1 is a system 100 architectural diagram according to an example embodiment.

Various embodiments herein include an engine that uses data science, history, and trends to successfully determine and suggest the complimentary add on and upsell items that are tailored to at least some of the customer, current trends, product popularity, recommendations, and other such factors. Add on and upsell recommendations may be based on data obtained from any number of data sources including omni-channel data of sales across one or more businesses, customer loyalty and experience data, social media friends/connections and purchases and recommendations by those friends, personal or friend favorites, and other data sources.

Some such embodiments include an engine that provides product recommendations based on historical and current transactional data from all business channels, such as in-store, mobile, web, and kiosks, and the like. Some such embodiments use both ticket-level detail of what is included in a current transaction or in a shopping basket and data from a customer loyalty solution. This data may be used to create a dynamically changing list of add-on\upsell items that is provided through an application programming interface (API) that can be leveraged from any channel the consumer interacts with either directly or indirectly via a teller, cashier, or other staff. The engine in such embodiments may be tuned based on a customer segment, product-types, geography, specific store, specific department in a store, food-type, and the like and can offer suggestions based on its learning. The engine may also leverage social media data in some embodiments. For example, social media friends and check-in data may be leverage to allow consumers to favorite and trust friend recommendations which can then be used to generate product recommendations. Recommendations provided by the engine in some such embodiments operate to provide statistically relevant up-sell and add-on suggestions. Sales of recommended items are tracked in some embodiments and the sale and lack of sales may be used in some embodiments as feedback to train the engine with learning algorithms to make recommendations that are more likely to lead to additional sales.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a system 100 architectural diagram according to an example embodiment. The system 100 is an example of a similarity modeling and identification system, such as may be employed in an omni-channel environment to identify and provide relevant and dynamic product and service recommendations for purposes of increasing up-sell and transaction add-on sales.

The terms omni-channel and multi-channel are intended as synonymous and are used interchangeably at times. These terms mean that customer transactions may occur via any number of channels, such as at terminals 102, 104, 106, which may be of various types. For example, the terminals 102, 104, 106 may include one or more of teller-assisted point-of-sale (POS) terminals, self-service terminals (SST) which may be POS SSTs, personal computers 108, a mobile telephone 110, a tablet 112, a smart watch 114, among others. Other channels may include set top boxes (STBs), smart-controllers of other devices or machines such as automobiles, boats, and tractors, vehicle entertainment systems, and others.

Each of the channels 102, 104, 106, 108, 110, 112, 114 generally provides a mechanism, such as an app or application or a web browser through which an electronic commerce web may be viewed and interacted with, that allows the user to conduct electronic commerce with retailers, which may include restaurants, stores that sell goods and services, service providers, and the like.

Regardless of the particular channel, a computing device of each respective channel 102, 104, 106, 108, 110, 112, 114 connects to a network 120. The network 120 may include one or more network-types, such as Ethernet, WI-FI, 3G and 4G wireless networks, 5G wireless networks, virtual private networks (VPNs), the Internet, a local area network, a wide area network, a proprietary network, a mesh network, among others in various embodiments.

Also connected to the network 120 is an omni-channel platform 130, or more simply referred to herein as a platform 130. The platform 130 provides a cloud-based solution for retailers to support the channels over which they interact with customers, either indirectly with teller or cashier-assisted channels or through direct customer interaction such as though SST channels (e.g., automated teller machines, self-service checkout POS terminals, etc.) or customer browser, app, or application-based channels. The platform 130 provides services, such as transaction and payment processing services, customer loyalty services, customer relationship management (CRM) services, transaction data archiving, customer communication services, among others.

Another service offered by the platform 130 is an add-on or up-sell recommendation service, such as to provide add-on or up-sell product or service recommendations within open transactions to increase gross sales and likely profit.

The system 100 also includes a database 132, which may in some embodiments be more than one database 132. Regardless, the database 132 is connected or is otherwise accessible to the platform 130. The database 132 stores configuration data, content data, product data, customer data, and other data, in various embodiments, depending on the services offered by the platform 130 in the particular embodiment. Note that a retailer need not subscribe to all services of the platform 130 to integrate with and utilize the platform 130. The database 132, in some embodiments herein, also stores one or more recommendation models, which may include a single model shared by platform 130 tenants, a model for each platform 130 tenant, or a number of models in between where some tenants share while others have their own models.

In some embodiments, the system 100 also includes connectivity with one or more social media platforms 140 (e.g., FACEBOOK®, TWITTER®, and the like). Connectivity may be established between the platform 130 and the social media platform 140, in some embodiments, by a product recommendation service with credentials of a particular customer as may be stored in the database 132 to obtain one or more of product and service recommendations, suggestions, and reviews Such data may then be used to identify and provide relevant product and service recommendations via the platform 130 to customers on one or more channels 102, 104, 106, 108, 110, 112, 114.

The system 100 in operation includes retailers conducting or receiving transactions via one or more of the channels 102, 104, 106, 108, 110, 112, 114. As the transactions are conducted, the channels 102, 104, 106, 108, 110, 112, 114 communicate over the network 120 with the platform 130. The platform 130 provides its services to the retailers for conducting their transactions and stores transaction data in the database 132. While a transaction is open, some embodiments include a channel 102, 104, 106, 108, 110, 112, 114 or a platform 130 service providing data representative of products and services that are the subject of an open transaction to a product recommendation or up-sell/add-on recommendation service on the platform 130. The service then uses that data to query a model for that retailer to identify products to recommend.

Recommendations may be identified in different ways in various embodiments. However, some embodiments include identifying recommendations based at least in part on the products and services that are the subject of the present, open transaction. Thus, such embodiments may query the model based on the product and services of the present transaction to identify prior transactions that included similar products and to identify products in those transactions that are not yet part of the present, open transaction. Some recommendations may be identified based on a simple or complex bought-this/bought-that type of analysis. Other recommendations may be identified based on social media data as described above. Thus, recommendations may be identified in different ways. In some embodiments however, the recommendation engine may be tailored for restaurants to identify other menu items that are likely to be desirable by a particular customer in view of what else the customer has already ordered, has previously ordered, may like in view of demographic or geographic information based on one or more of a present location and customer loyalty information, and the like.

Figure 2:
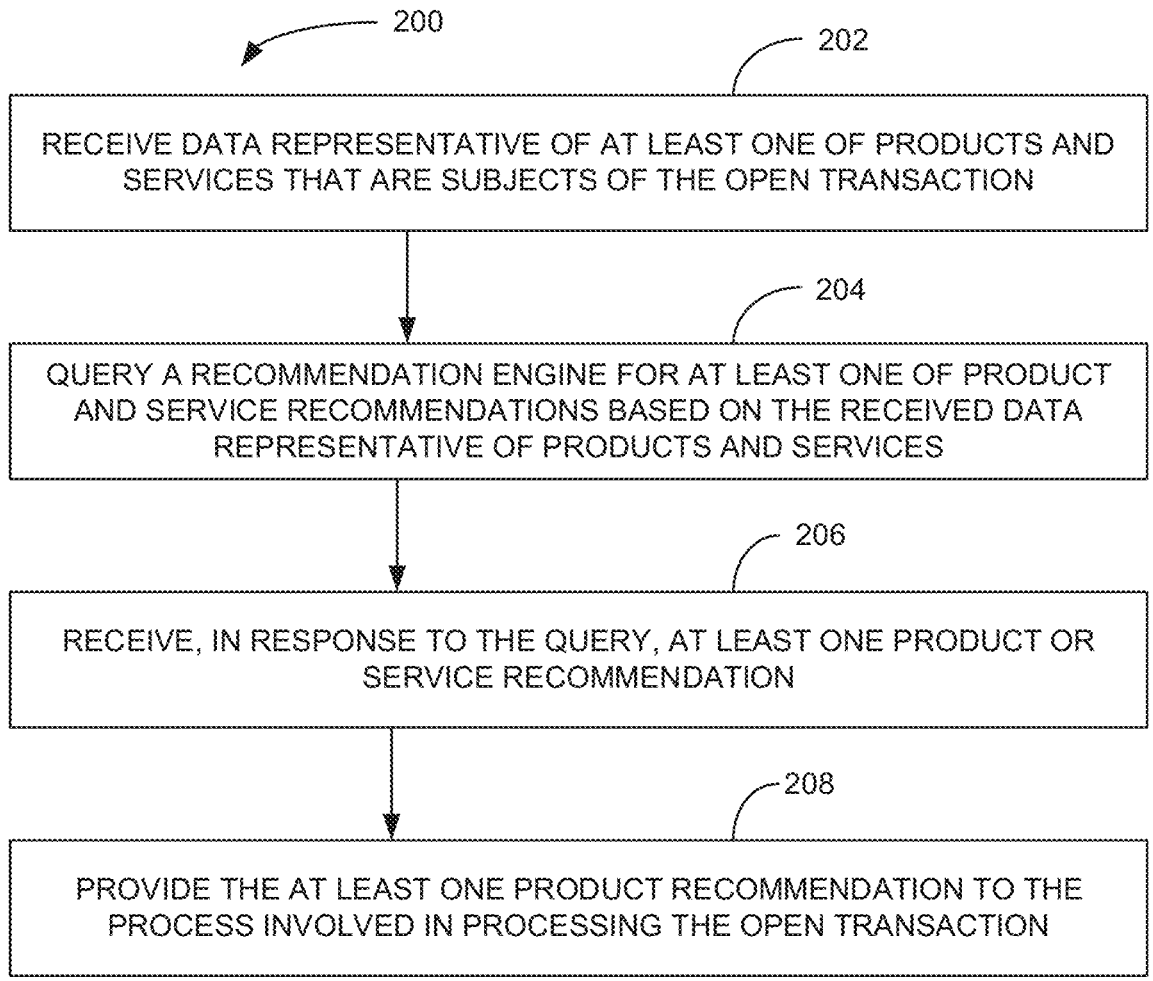
FIG. 2 is a logical block diagram of a method, according to an example embodiment.

The method 200 of FIG. 2 provides an example of method embodiments that may be performed on the system 100.

FIG. 2 is a logical block diagram of a method 200, according to an example embodiment. The method 200 is an example of a method that may be performed on the platform 130 of the system 100 illustrated in FIG. 1.

The method 200 includes receiving 202, from a process involved in processing an open transaction, data representative of at least one of products and services that are subjects of the open transaction and querying 204 a recommendation engine for at least one of product and service recommendations based on the received data representative of products and services. The method 200 further receives 206, in response to the query, at least one product or service recommendation and then provides 208 the at least one product recommendation to the process involved in processing the open transaction.

In some embodiments of the method 200, the recommendation engine generates product recommendations based on a model. This model may be generated from historical transaction data stored in a database. A generated model may include data linking relationships identified between products and services that are commonly purchased together, between products or services and customer attributes, and products and services of interest in particular geographies and during finite periods. In one such embodiment, the model is further generated based at least in part on data representative of one or both of product and service recommendations and reviews on a social media platform. Regardless, a model may be regenerated on a periodic schedule.

In some of these and other method 200 embodiments, relationships of the model may be identified for inclusion therein by statistical analysis and recommendations generated by the recommendation engine based on statistical similarity measures. The statistical similarity measures may include one or more of nearest neighbor calculations, Pearson's Correlation, cosine, Jaccard, and Karypis. In some embodiments, data considered in one or both of generating the model and using the model may take into account an age of the underlying data. For example, models may be generated from a newest measure of data, such as data that is less than one year old, or there can be multiple models and weighting for recommendations identified in models of differently aged data.

In some embodiments of the method 200, the recommendation engine executes to perform data processing activities. These data processing activities of the recommendation engine may include identifying a certain number of most similar customer prior purchase transactions of products and services to the products and services that are the subject of the open transaction. The data processing activities may also include identifying products in the identified certain number of most similar transactions that are not the subject of the present transaction and outputting the identified products in response to the query.

Figure 3:
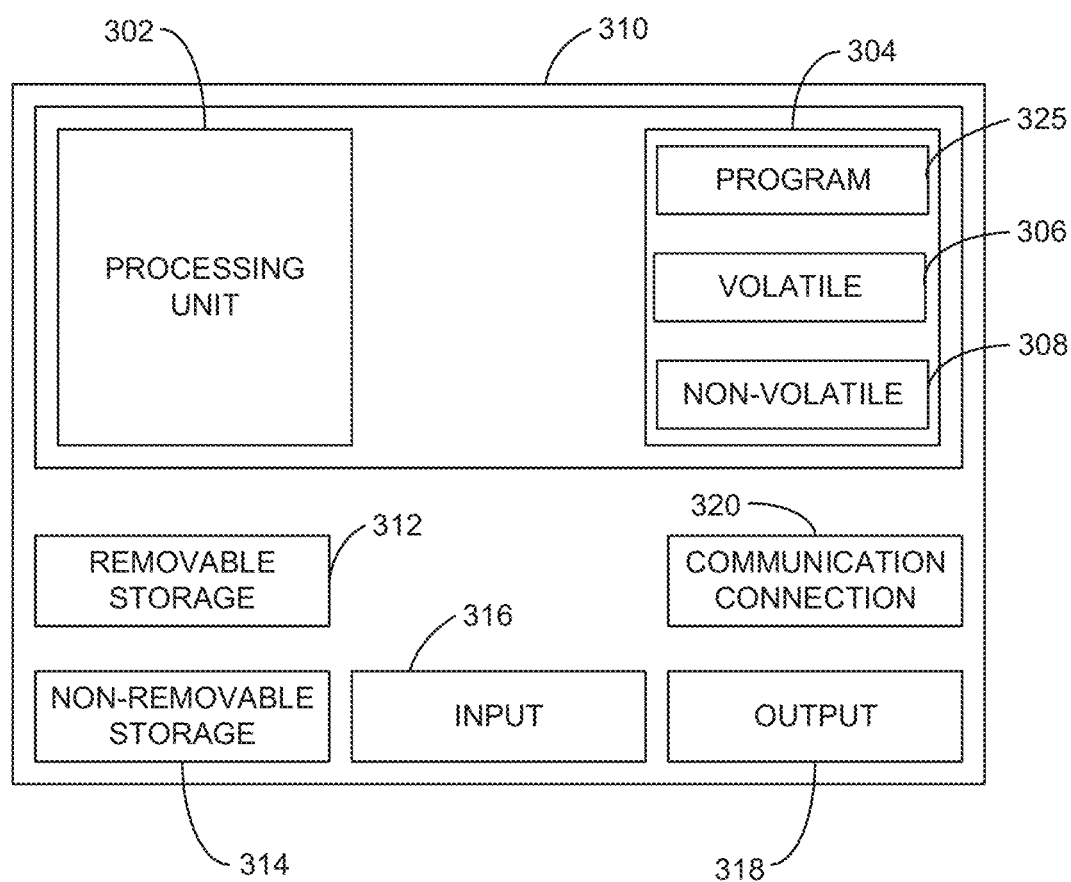
FIG. 3 is a block diagram of a computing device, according to an example embodiment.

FIG. 3 is a block diagram of a computing device, according to an example embodiment. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 310, may include a processing unit 302, memory 304, removable storage 312, and non-removable storage 314. Memory 304 may include volatile memory 306 and non-volatile memory 308. Computer 310 may include—or have access to a computing environment that includes—a variety of computer-readable media, such as volatile memory 306 and non-volatile memory 308, removable storage 312 and non-removable storage 314. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 310 may include or have access to a computing environment that includes input 316, output 318, and a communication connection 320. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 302 of the computer 310. A hard drive, CD-ROM, and RAM are some examples of articles including a non-transitory computer-readable medium. For example, a computer program 325 capable of performing one or more of the methods illustrated and described herein.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:

receiving, via a network from a process involved in processing an open transaction on a computer processor of a Point-of-Sale (POS) terminal, data representative of at least one of products and services that are subjects of the open transaction;

querying a recommendation engine that executes on the computer processor for at least one of product and service recommendations based on the received data representative of products and services, the recommendation engine executable on the computer processor to perform data processing comprising:

identifying a certain number of similar customer prior purchase transactions of products and services to the at least one of products and services that are the subject of the open transaction;

identifying at least one of products and services in the identified certain number of similar transactions that are not the subject of the present transaction based on a model generated, and regenerated on a periodic schedule, from historical transaction data stored in a database and based at least in part on data representative of one or both of product and service recommendations and reviews retrieved from at least one social media platform, the model including data linking relationships identified between products and services that are commonly purchased together and selected for inclusion therein by statistical analysis and recommendations generated by the recommendation engine based on statistical similarity measures, between products or services and customer attributes, and products and services of interest in particular geographies and during finite periods; and outputting the identified at least one of products and services in response to the query;

receiving, in response to the query, at least one product or service recommendation; and providing, by transmitting data via the network, the at least one product and service recommendation to the process involved in processing the open transaction on the POS terminal.

2. The method of claim 1, wherein the statistical similarity measures include Pearson's Correlation.

3. The method of claim 1, further comprising:

receiving customer identifying data;

retrieving social media data associated with a loyalty account associated with the customer identifying data;

retrieving any social media connection product suggestions from at least one social media platform based on the retrieved social media data; and providing at least one product recommendation based on the data retrieved from the social media platform.

4. A system comprising:

a processor, a network interface device, and a memory storing instructions executable by the processor to perform data processing activities comprising:

receiving, via the network interface device, from a process involved in processing an open transaction on a Point-of-Sale (POS) terminal, data representative of at least one of products and services that are subjects of the open transaction;

querying a recommendation engine that executes on the processor for at least one of product and service recommendations based on the received data representative of at least one of products and services that are subject of the open transaction, the recommendation engine executable on a computer processor to perform data processing comprising:

identifying a certain number of similar customer prior purchase transactions of products and services to the products and services that are the subject of the open transaction;

identifying at least one of products and services in the identified certain number of similar transactions that are not the subject of the present transaction based on a model generated, and regenerated on a periodic schedule, from historical transaction data stored in a database and based at least in part on data representative of one or both of product and service recommendations and reviews retrieved from at least one social media platform, the model including data linking relationships identified between products and services that are commonly purchased together and selected for inclusion therein by statistical analysis and recommendations generated by the recommendation engine based on statistical similarity measures, between products or services and customer attributes, and products and services of interest in particular geographies and during finite periods; and outputting the identified at least one of products and services in response to the query;

receiving, in response to the query, at least one product or service recommendation; and providing, via the network interface device to the POS terminal, the at least one product recommendation to the process involved in processing the open transaction.

5. The system of claim 4, wherein the statistical similarity measures include Pearson's Correlation.

* * * * *